(12) United States Patent
Yoneyama

(10) Patent No.: US 12,054,174 B2
(45) Date of Patent: Aug. 6, 2024

(54) MOVING BODY

(71) Applicant: HONDA MOTOR CO., LTD., Tokyo (JP)

(72) Inventor: Hitomi Yoneyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 334 days.

(21) Appl. No.: 17/459,565

(22) Filed: Aug. 27, 2021

(65) Prior Publication Data

US 2022/0063656 A1 Mar. 3, 2022

(30) Foreign Application Priority Data

Aug. 27, 2020 (JP) .................. 2020-143962

(51) Int. Cl.
| | | |
|---|---|---|
| *B60W 60/00* | (2020.01) | |
| *B60W 50/14* | (2020.01) | |
| *G01S 7/497* | (2006.01) | |
| *G01S 17/931* | (2020.01) | |

(Continued)

(52) U.S. Cl.
CPC .......... *B60W 60/001* (2020.02); *B60W 50/14* (2013.01); *G01S 17/931* (2020.01); *H04N 23/50* (2023.01); *H04N 23/90* (2023.01); *B60W 2050/146* (2013.01); *B60W 2420/403* (2013.01);
(Continued)

(58) Field of Classification Search
CPC ....... B60R 25/24; B60R 25/102; B60R 25/32; B60R 2325/20; G07C 5/0808; G07C 9/257; G07C 2009/00507; G07C 9/00309; G07C 9/00563; H04W 4/48; H04W 12/06; B60K 2370/152; B60K 2370/197; B60K 35/00
See application file for complete search history.

(56) References Cited

U.S. PATENT DOCUMENTS

| | | | | |
|---|---|---|---|---|
| 11,493,922 | B1 * | 11/2022 | Avram .................. | B60W 40/02 |
| 2017/0229053 | A1 * | 8/2017 | Ishizuka .............. | G09G 3/2003 |
| 2018/0009418 | A1 * | 1/2018 | Newman .................. | B08B 3/02 |

(Continued)

FOREIGN PATENT DOCUMENTS

| | | |
|---|---|---|
| JP | 2003-133826 A | 5/2003 |
| JP | 2004-001736 A | 1/2004 |

(Continued)

OTHER PUBLICATIONS

Jan. 30, 2024, Translation of Chinese Office Action issued for related CN Application No. 202110978061.5.
(Continued)

*Primary Examiner* — Abby Y Lin
*Assistant Examiner* — Renee LaRose
(74) *Attorney, Agent, or Firm* — Paratus Law Group, PLLC

(57) ABSTRACT

A moving body including a first external world information acquisition device is autonomously movable based on first external world information acquired by the first external world information acquisition device. An outer shell member of the moving body includes an upper surface facing upward of the moving body. The first external world information acquisition device is provided on the upper surface. The first external world information acquisition device is arranged below an uppermost portion of the upper surface in an upper-lower direction of the moving body.

2 Claims, 10 Drawing Sheets

(51) Int. Cl.
    *H04N 23/50*     (2023.01)
    *H04N 23/90*     (2023.01)

(52) U.S. Cl.
    CPC ........ *B60W 2420/408* (2024.01); *G01S 7/497* (2013.01)

(56) References Cited

U.S. PATENT DOCUMENTS

| | | | |
|---|---|---|---|
| 2020/0072964 A1 | 3/2020 | Aso | |
| 2020/0283021 A1 | 9/2020 | Horii et al. | |
| 2020/0361449 A1* | 11/2020 | Suzuki | G06V 20/588 |
| 2021/0016703 A1* | 1/2021 | Shitara | G01S 7/4813 |
| 2021/0181000 A1* | 6/2021 | Li | H04N 23/52 |

FOREIGN PATENT DOCUMENTS

| | | |
|---|---|---|
| JP | 2006-332288 A | 12/2006 |
| JP | 2008-247254 A | 10/2008 |
| JP | 2011-230563 A | 11/2011 |
| JP | 2017-007417 A | 1/2017 |
| JP | 2017-149357 A | 8/2017 |
| JP | 2018-197010 A | 12/2018 |
| JP | 2020-034329 A | 3/2020 |
| WO | WO 2016/204037 A1 | 12/2016 |
| WO | WO 2019/106787 A1 | 6/2019 |

OTHER PUBLICATIONS

Aug. 8, 2023, Translation of Japanese Office Action issued for related JP Application No. 2020-143962.

\* cited by examiner

MOVING BODY

CROSS-REFERENCE TO RELATED APPLICATIONS

This application is based on and claims priority under 35 USC 119 from Japanese Patent Application No. 2020-143962 filed on Aug. 27, 2020.

TECHNICAL FIELD

The present disclosure relates to a moving body such as a vehicle, and more particularly to an autonomously movable moving body.

BACKGROUND ART

In the related art, a moving body on which an external world information acquisition device is mounted has been known. For example, JP-A-2008-247254 discloses a vehicle in which an image capturing unit as an external world information acquisition device is mounted on an upper end portion on a left side surface of the vehicle, and external world information on a lower side around the left side surface of the vehicle can be acquired.

In recent years, in a case where an external environment information acquisition device is mounted on an autonomously movable moving body such as an autonomous driving vehicle which has been actively researched and developed, it is preferable that the external world information acquisition device can acquire external world information in a wider area.

However, in the vehicle of JP-A-2008-247254, the image capturing unit is mounted on the left side surface of the vehicle, and the external world information which can be acquired by the image capturing unit is limited to a lower area around the left side surface of the vehicle. Therefore, in the autonomously movable moving body, it is desirable to provide an external world information acquisition device at a position at which the external world information in a wider angle area can be acquired.

Therefore, it is conceivable to provide the external world information acquisition device on an upper surface of an outer shell member of the vehicle as the position at which the external world information in the wider angle area can be acquired. However, in a case where the external world information acquisition device is mounted so as to protrude from the upper surface of the outer shell member of the moving body, when the moving body comes into contact with an obstacle above, the external world information acquisition device comes into contact with the obstacle above the moving body earlier than the outer shell member of the moving body. Therefore, the external world information acquisition device may be damaged.

In particular, in the autonomously movable moving body such as an autonomous driving vehicle, when the external world information acquisition device is damaged and cannot appropriately acquire the external world information, an appropriate autonomous movement may not be possible.

SUMMARY

An object of the present disclosure is to provide a moving body capable of suppressing damage to an external world information acquisition device.

According to the present disclosure, there is a moving body including:

a first external world information acquisition device, in which:
the moving body is autonomously movable based on first external world information acquired by the first external world information acquisition device;
an outer shell member of the moving body includes an upper surface facing upward of the moving body,
the first external world information acquisition device is provided on the upper surface; and
the first external world information acquisition device is arranged below an uppermost portion of the upper surface in an upper-lower direction of the moving body.

According to the present disclosure, since the first external world information acquisition device is provided on the upper surface of the outer shell member and is arranged below the uppermost portion of the upper surface in the upper-lower direction, even when the moving body comes into contact with an obstacle above, the uppermost portion of the upper surface of the outer shell member comes into contact with the obstacle above the moving body earlier than the first external world information acquisition device. As a result, it is possible to suppress the obstacle from coming into contact with the first external world information acquisition device.

DESCRIPTION OF EMBODIMENTS

Figure 1:
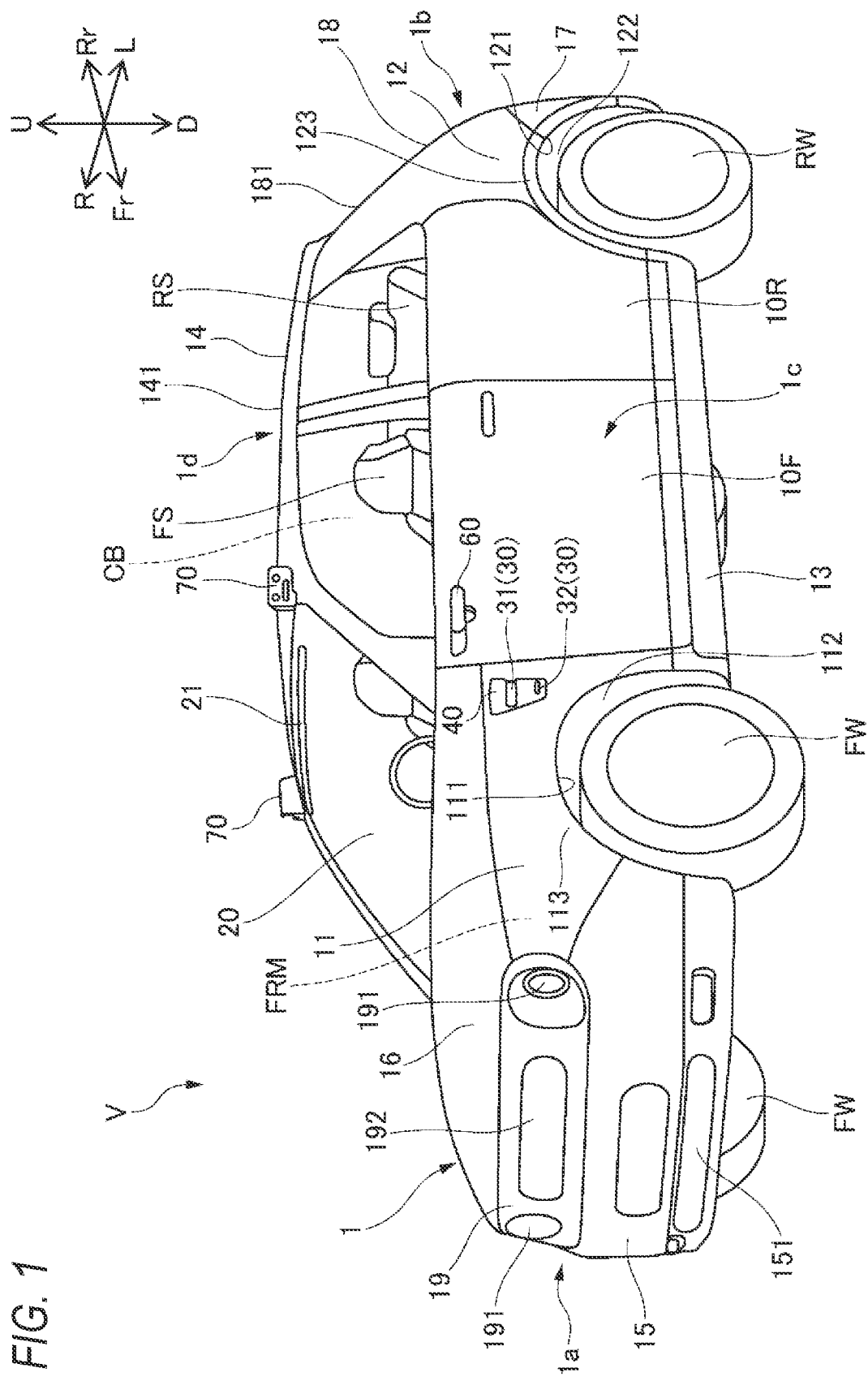
FIG. 1 is a perspective view of a vehicle according to an embodiment of the present disclosure, as viewed obliquely from the front left.

Hereinafter, a vehicle as an embodiment of a moving body of the present disclosure will be described with reference to the accompanying drawings. Noted that the drawings are viewed in directions of reference numerals. In the present specification and the like, in order to simplify and clarify the description, a front-rear direction, a left-right direction, and an upper-lower direction are described in accordance with directions viewed from a driver of a vehicle. In the drawings, a front side of the vehicle is denoted by Fr, a rear side thereof is denoted by Rr, a left side thereof is denoted by L, a right side thereof is denoted by R, an upper side thereof is denoted by U, and a lower side thereof is denoted by D.

(Vehicle)

First, a configuration of a vehicle V of the present embodiment will be described with reference to FIG. 1.

The vehicle V is an autonomously movable moving body. Hereinafter, an autonomous movement of the vehicle V is also referred to as autonomous driving.

As illustrated in FIG. 1, the vehicle V is an automobile including a drive source (not illustrated) and vehicle wheels having a drive wheel which is driven by power of the drive source and a turning wheel which can be turned. In the present embodiment, the vehicle V is a four-wheel automobile including a pair of left and right front wheels FW and a pair of left and right rear wheels RW. The drive source of the vehicle V is, for example, an electric motor. The drive source of the vehicle V may be an internal combustion engine such as a gasoline engine or a diesel engine, or a combination of the electric motor and the internal combustion engine. In addition, the drive source of the vehicle V may drive the pair of left and right front wheels FW, may drive the pair of left and right rear wheels RW, or may drive four wheels of the pair of left and right front wheels FW and the pair of left and right rear wheels RW. The front wheel FW and the rear wheel RW may both be the turning wheels which can turn, or either one of the front wheel FW and the rear wheel RW may be the turning wheel which can turn.

The vehicle V includes a skeleton member (not illustrated) having a monocoque structure by, for example, welding and assembling steel plate panels, and an outer shell member 1 covering the skeleton member and constituting an outer shell of the vehicle V. The vehicle V includes a vehicle compartment CB which accommodates an occupant, and a front room FRM which is formed in front of the vehicle compartment CB. Each of the vehicle compartment CB and the front room FRM is a space surrounded by the outer shell member 1. The vehicle compartment CB and the front room FRM are partitioned by a dash panel (not illustrated) extending in the upper-lower direction and the left-right direction. The drive source or the like of the vehicle V is accommodated in the front room FRM.

The outer shell member 1 includes a front surface 1a which faces the front of the vehicle V, a rear surface 1b which faces the rear of the vehicle V, a pair of left and right side surfaces 1c which face the left-right direction of the vehicle V, and an upper surface 1d which faces upward of the vehicle V.

The outer shell member 1 includes a pair of left and right front doors 10F forming the left and right side surfaces 1c of the vehicle V on the front side of the vehicle compartment CB, and a pair of left and right rear doors 10R forming the left and right side surfaces 1c of the vehicle V on the rear side of the vehicle compartment CB. Further, the outer shell member 1 includes a pair of left and right front fender panels 11 forming the left and right side surfaces 1c of the vehicle V in front of the front doors 10F, and a pair of left and right rear fender panels 12 forming the left and right side surfaces 1c of the vehicle V behind the rear doors 10R. The outer shell member 1 includes a pair of left and right side sills 13 extending in the front-rear direction from the front fender panels 11 to the rear fender panels 12 on the left side and the right side of the vehicle V along lower edges of the front door 10F and the rear door 10R. Further, the outer shell member 1 further includes a roof panel 14 which extends in the front-rear direction and the left-right direction along upper edges of the pair of left and right front doors 10F and the pair of left and right rear doors 10R and forms an upper surface of the vehicle compartment CB of the vehicle V. The outer shell member 1 further includes a front bumper 15 forming a front lower portion of the front room FRM of the vehicle V. and a bonnet 16 forming an upper surface of the front room FRM of the vehicle V. Further, the outer shell member 1 includes a rear bumper 17 forming a rear lower portion of the vehicle V, and a tailgate 18 forming a rear upper portion of the vehicle V.

Each of the front fender panels 11 is formed with a front wheel arch portion 111 which is curved in a substantially circular arc shape in which a lower edge of the front fender panel 11 is convex upward. A front wheel house 112 is formed below the front wheel arch portion 111, and the front wheel FW is accommodated in the front wheel house 112. Each of the front fender panels 11 is formed with a front blister fender portion 113 which bulges outward in the left-right direction of the vehicle V along the front wheel arch portion 111.

Each of the rear fender panels 12 is formed with a rear wheel arch portion 121 which is curved in a substantially circular arc shape in which a lower edge of the rear fender panel is convex upward. A rear wheel house 122 is formed below the rear wheel arch portion 121, and the rear wheel RW is accommodated in the rear wheel house 122. Each of the rear fender panels 12 is formed with a rear blister fender portion 123 which bulges outward in the left-right direction of the vehicle V along the rear wheel arch portion 121.

The front bumper 15 has a shape in which left and right ends of the front bumper 15 wrap around to the left and right front wheel arch portions 111. Further, a front grill 151 for introducing traveling wind into the front room FRM is provided in a front lower portion of the front bumper 15.

A front garnish 19 which extends in the upper-lower direction and the left-right direction from the left front fender panel 11 to the right front fender panel 11 is provided above the front bumper 15 between the front bumper 15 and the bonnet 16. A pair of left and right headlights 191 which illuminate the front of the vehicle V are provided at both left and right end portions of the front garnish 19. The pair of left and right headlights 191 are provided so as to be separated from each other in the left-right direction. The front garnish 19 is provided with an information display unit 192 which extends in the left-right direction at a central portion of the vehicle V in the left-right direction between the pair of left and right headlights 191. The information display unit 192 displays various information in front of the vehicle V. A traffic participant (including a pedestrian, a bicycle, a motorcycle, other vehicles, or the like, and the same applies to the following description) existing in front of the vehicle V can visually recognize various information from the information display unit 192.

In this way, the front bumper 15 and the front garnish 19 form the front surface 1a of the outer shell member 1. The rear bumper 17 and the tailgate 18 form the rear surface 1b of the outer shell member 1. The pair of left and right front doors 10F, the pair of left and right rear doors 10R, the pair of left and right front fender panels 11, the pair of left and right rear fender panels 12, and the pair of left and right side sills 13 form the pair of left and right side surfaces 1c of the outer shell member 1. The roof panel 14 forms the upper surface 1d of the outer shell member 1. Further, in the left-right direction of the vehicle V, the outermost portion of the front blister fender portion 113 is the outermost portion 1e of the side surface 1c of the outer shell member 1 (see FIG. 3). The roof panel 14 is curved so as to be convex upward, and an uppermost portion of the roof panel 14 is an uppermost portion 1f of the upper surface 1d of the outer shell member 1 in the upper-lower direction of the vehicle V, in a side view of the vehicle V (see FIG. 4).

A front window 20 is provided on the front surface of the vehicle compartment CB. The front window 20 is formed of a light transmitting member, for example, glass, which is visible to the outside of the vehicle from the inside of the vehicle compartment CB. The front window 20 extends downward from a front end portion of the roof panel 14 to a vicinity of a rear end portion of the bonnet 16 while being inclined forward. The front window 20 extends over substantially the entire region of the vehicle V in the left-right direction.

A front window display unit 21 extending in the left-right direction is provided at an upper end portion of the front window 20. The front window display unit 21 displays information based on a moving state (driving state) of the vehicle V to an outer portion of the vehicle V. In the present embodiment, the front window display unit 21 is a light emitting diode (LED) illumination device extending in the left-right direction at the upper end portion of the front window 20. The front window display unit 21 is turned on when the vehicle V is in an autonomous driving state in which the vehicle V autonomously moves, and is turned off when the vehicle V is not in the autonomous driving state. The traffic participant existing in front of the vehicle V can visually recognize information on whether the vehicle V is in the autonomous driving state from the front window display unit 21.

Front seats FS on which the occupant can sit and rear seats RS which are arranged behind the front seats FS and on which the occupant can sit are provided in the vehicle compartment CB which is inside the vehicle V.

A rear window 181 is provided on the tailgate 18 forming an upper portion of the rear surface 1b of the outer shell member 1 of the vehicle V. The rear window 181 is formed of a light transmitting member, for example, a smoke glass, which is visible to the outside of the vehicle from the inside of the vehicle compartment CB. The rear window 181 extends downward while being inclined rearward from an upper end portion of the tailgate 18 near a rear end portion of the roof panel 14. The rear window 181 extends over substantially the entire region of the vehicle V in the left-right direction.

Figure 4:
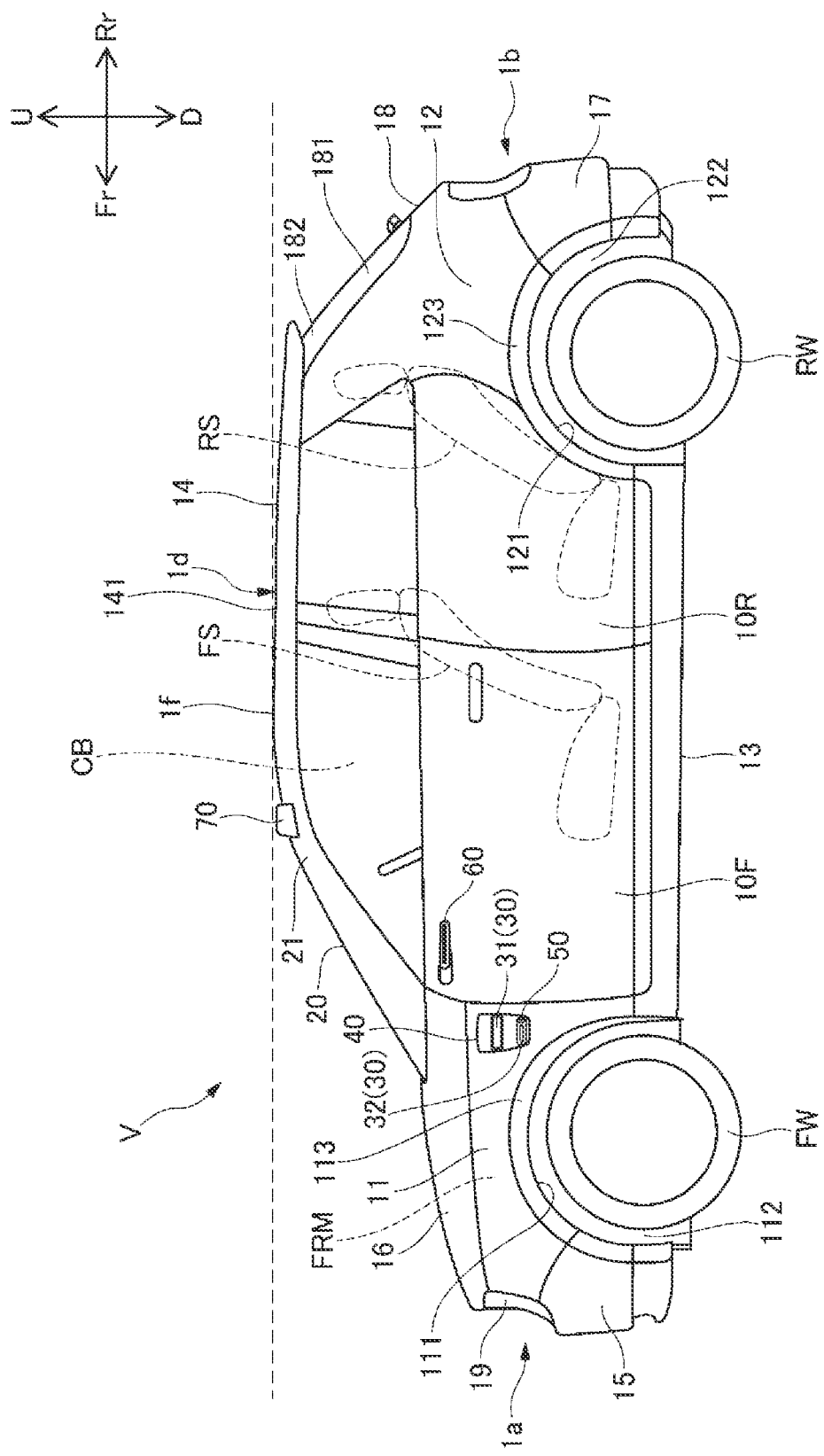
FIG. 4 is a side view of the vehicle in FIG. 1 as viewed from the left side.

A rear window display unit 182 extending in the left-right direction is provided at an upper end portion of the rear window 181 (see FIG. 4). The rear window display unit 182 displays information based on the moving state (driving state) of the vehicle V to the outer portion of the vehicle V. In the present embodiment, the rear window display unit 182 is the light emitting diode (LED) illumination device extending in the left-right direction at the upper end portion of the rear window 181. The rear window display unit 182 is turned on when the vehicle V is in the autonomous driving state in which the vehicle V autonomously moves, and is turned off when the vehicle V is not in the autonomous driving state. The traffic participant existing behind the vehicle V can visually recognize information on whether the vehicle V is in the autonomous driving state from the rear window display unit 182.

(Roof Camera Device)

The vehicle V further includes a pair of left and right roof camera devices 70. Each of the roof camera devices 70 forms an image of an external world of the vehicle V on an image capturing element, and converts the image into an image signal which is an electric signal, thereby acquiring first external world information 700 of the vehicle V. The roof camera device 70 is an example of a first external world information acquisition device which acquires the first external world information 700. Each of the roof camera devices 70 forms the image of the external world of the vehicle V on the image capturing element, and converts the image into the image signal which is the electric signal, thereby acquiring the first external world information 700 of the vehicle V.

Each of the pair of left and right roof camera devices 70 is provided at a front end portion of an upper surface 141 of the roof panel 14 forming the upper surface of the outer shell member 1 so as to protrude upward from the upper surface 141 of the roof panel 14. Therefore, each of the pair of left and right roof camera devices 70 is arranged at a position adjacent to the upper end portion of the front window 20 of the vehicle V. One of the pair of left and right roof camera devices 70 is provided at a left end portion on the front end portion of the upper surface 141 of the roof panel 14, and the other of the pair of left and right roof camera devices 70 is provided at a right end portion on the front end portion of the upper surface 141 of the roof panel 14.

Figure 2A:
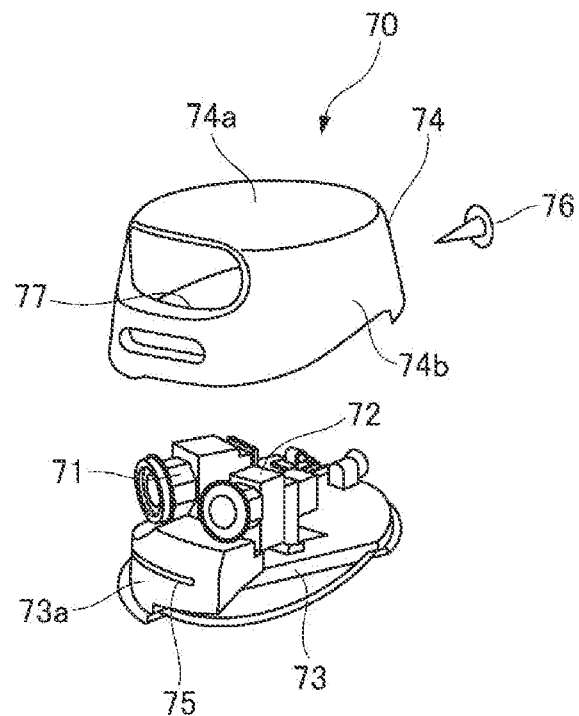
FIG. 2A is an exploded perspective view of a roof camera device provided on the left side of the vehicle of FIG. 1.

As illustrated in FIG. 2A, the roof camera device 70 includes a telephoto camera unit 71, a wide-angle camera unit 72, a substantially disk-shaped pedestal portion 73 to which the telephoto camera unit 71 and the wide-angle camera unit 72 are fixed, and a cover portion 74 which covers the telephoto camera unit 71 and the wide-angle camera unit 72 from above.

The telephoto camera unit 71 includes a telephoto lens and an image capturing element, and acquires an external world image in front of the vehicle V. The telephoto camera unit 71 is fixed to an upper surface of the substantially disk-shaped pedestal portion 73.

The wide-angle camera unit 72 includes a wide-angle lens and an image capturing element, and acquires an external world image on an obliquely forward side on the outer side of the vehicle V in the left-right direction. The wide-angle camera unit 72 is fixed to the upper surface of the substantially disk-shaped pedestal portion 73 adjacent to the telephoto camera unit 71 on the outer side of the vehicle V.

Since the telephoto camera unit 71 includes the telephoto lens, it is possible to acquire the external world image in front of the vehicle V to a greater distance. Meanwhile, since the wide-angle camera unit 72 includes the wide-angle lens, it is possible to acquire the external world image at a wider angle on the obliquely forward side on the outer side of the vehicle V in the left-right direction.

A display unit 75 which displays the information based on the operation state of the roof camera device 70 to the outer portion of the vehicle V is provided on a front surface 73a of the pedestal portion 73. In the present embodiment, the display unit 75 is an LED illumination device which extends in the left-right direction on the front surface 73a of the pedestal portion 73. In the present embodiment, the display unit 75 is turned on when the roof camera device 70 is in an operating state, and is turned off when the roof camera device 70 is in a non-operating state. The traffic participant existing in front of the vehicle V can visually recognize information on whether the roof camera device 70 is in the operating state or in the non-operating state from the display unit 75 of the roof camera device 70.

The cover portion 74 includes an upper surface 74a which covers upper sides of the telephoto camera unit 71 and upper sides of the wide-angle camera unit 72, and a side surface 74b which extends downward in a tubular shape from an outer edge of the upper surface 74a. The cover portion 74 is loosely fitted to an outer edge of the pedestal portion 73 at a lower end portion of the side surface 74b of the cover portion 74, and is further fixed to the pedestal portion 73 by a fastening member 76 such as a bolt.

Figure 2B:
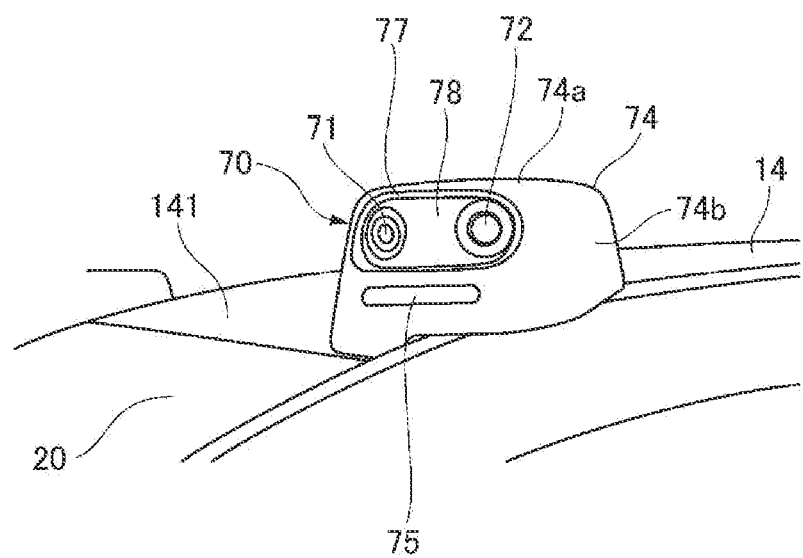
FIG. 2B is an enlarged perspective view of the roof camera device attached on a roof panel of the vehicle.

As illustrated in FIG. 2B, the pedestal portion 73 is fixed to the roof panel 14 of the vehicle V, whereby the roof camera device 70 is fixed to the roof panel 14 of the vehicle V.

Accordingly, since the cover portion 74 of the roof camera device 70 can be easily removed, when maintenance and replacement of built-in components of the telephoto camera unit 71 and/or the wide-angle camera unit 72 are performed, the cover portion 74 is removed from the pedestal portion 73 without removing the roof camera device 70 from the vehicle V, so that it is possible to perform the maintenance and replacement of the built-in components of the telephoto camera unit 71 and/or the wide-angle camera unit 72. Therefore, it is possible to easily maintain and replace the built-in components of the telephoto camera unit 71 and/or the wide-angle camera unit 72 without removing the roof camera device 70 from the vehicle V.

The side surface 74b of the cover portion 74 is provided with an opening portion 77 at a position overlapping the telephoto camera unit 71 as viewed from the front of the vehicle V and at a position overlapping the wide-angle camera unit 72 as viewed obliquely forward on the outer side of the vehicle V in the left-right direction. A cap member 78 which closes the opening portion 77 except for a telephoto lens surface of the telephoto camera unit 71 and a wide-angle lens surface of the wide-angle camera unit 72 is fitted into the opening portion 77. The telephoto camera unit 71 and the wide-angle camera unit 72 respectively acquire the external world image in front of the vehicle V and the external world image on the obliquely forward side on the outer side of the vehicle V from the opening portion 77.

Figure 3:
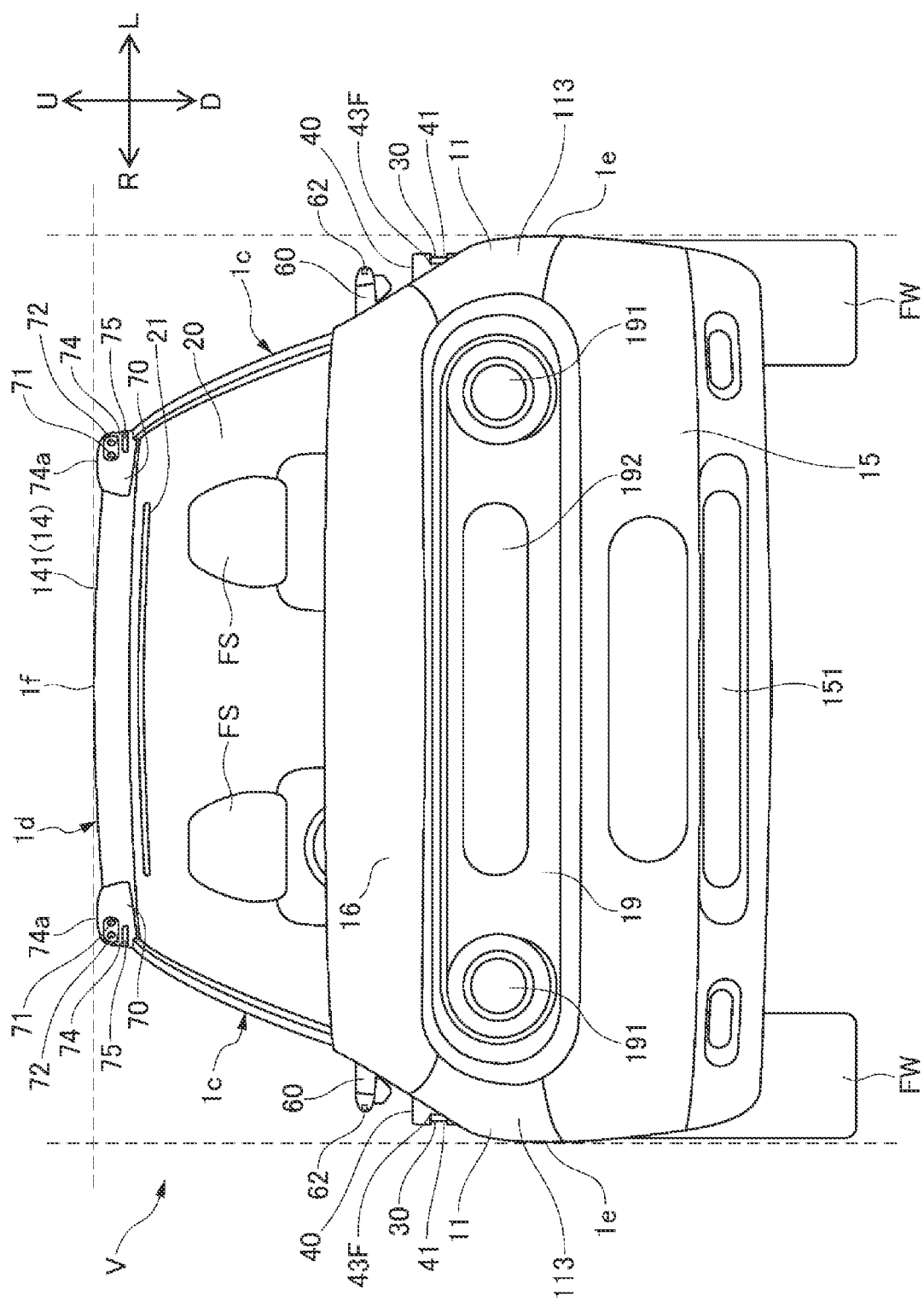
FIG. 3 is a front view of the vehicle in FIG. 1 as viewed from the front.

As illustrated in FIGS. 3 and 4, the pair of left and right roof camera devices 70 are arranged below the uppermost portion of the roof panel 14, that is, the uppermost portion 1f of the upper surface 1d of the outer shell member 1 in the upper-lower direction in a front view and a side view of the vehicle V.

Accordingly, in a case where the vehicle V comes into contact with an obstacle above, the uppermost portion of the roof panel 14, which is the uppermost portion 1f of the upper surface 1d of the outer shell member 1, comes into contact with the obstacle above the vehicle V earlier than the roof camera device 70. Therefore, it is possible to suppress the obstacle from coming into contact with the roof camera device 70, and it is possible to suppress the roof camera device 70 from being damaged in the case where the vehicle V comes into contact with the obstacle above.

The roof camera device 70 can be provided on the upper surface of the roof panel 14 forming the upper surface 1d of the outer shell member 1 of the vehicle V without increasing the total height of the vehicle V.

As illustrated in FIG. 3, in the front view of the vehicle V, the shapes of the upper surfaces 74a of the cover portions 74 of the pair of left and right roof camera devices 70 are similar to the shape of the upper surface 141 of the roof panel 14 forming the upper surface 1d of the outer shell member 1.

Accordingly, a sense of unity between the roof camera device 70 and the roof panel 14 is improved by a visual effect, and therefore, when a person existing outside the vehicle V views the vehicle V, it is possible to reduce a sense of discomfort caused by the roof camera device 70 protruding upward from the roof panel 14.

The display units 75 of the pair of left and right roof camera devices 70 are arranged above the front window display unit 21 which extends in the left-right direction at the upper end portion of the front window 20.

Accordingly, information based on the moving state (driving state) of the vehicle V displayed by the front window display unit 21, that is, in the present embodiment, the information on whether the vehicle V is in the autonomous driving state in which the vehicle V autonomously moves, and information based on the operation state of the roof camera device 70 displayed by the display unit 75 of each of the pair of left and right roof camera devices 70, that is, in the present embodiment, the information on whether the roof camera device 70 is in the operating state or in the non-operating state can be prevented from being erroneously recognized by a person existing outside the vehicle V.

As illustrated in FIG. 4, the roof camera device 70 is arranged at a position closer to the front seat FS than the rear seat RS provided in the vehicle compartment CB in the front-rear direction of the vehicle V.

Accordingly, the pair of left and right roof camera devices 70 can acquire the external world information as the first external world information 700, the external world information being close to a front field of view of the occupant seated in the front seat FS.

The roof camera device 70 provided on a left end side of the roof panel 14 of the vehicle V acquires first left-side external world information 700L as the first external world information 700, the first left-side external world information 700L being on the front side and a diagonally forward left side of the vehicle V. The roof camera device 70 provided on a right end side of the roof panel 14 of the vehicle V acquires first right-side external world information 700R as the first external world information 700, the first right-side external world information 700R being on the front side and a diagonally forward right side of the vehicle V.

(LiDAR Device)

Returning to FIG. 1, the pair of left and right front fender panels 11 forming the side surface 1c of the outer shell member 1 are each provided with a light detection and ranging (LiDAR) device 30. The LiDAR device 30 irradiates an object while scanning the object with a laser beam emitted in a pulsed manner, measures scattered light or reflected light thereof, and analyzes a distance to the object at a long distance and a property and a shape of the object. Therefore, the LiDAR device 30 acquires second external world information 300 of the vehicle V. The LiDAR device 30 is an example of a second external world information acquisition device which acquires the second external world information 300. The LiDAR device 30 is arranged between the front blister fender portion 113 of the front fender panel 11 and the rear blister fender portion 123 of the rear fender panel 12 in the front-rear direction. More specifically, in the front-rear direction, the LiDAR device 30 is arranged between the outermost portion of the front blister fender portion 113 in the left-right direction and the outermost portion of the rear blister fender portion 123 in the left-right direction.

Accordingly, in a case where the vehicle V is traveling forward and there is a flying object (including a small stone, an insect, mud, and the like) from the front of the vehicle V, the flying object collides with and adheres to the front blister fender portion 113 in front of the LiDAR device 30. Therefore, when the vehicle V is traveling forward, it is possible to suppress the flying object from the front of the vehicle V from colliding with and adhering to the LiDAR device 30. Further, in a case where the vehicle V is traveling rearward and there is a flying object from the rear of the vehicle V, the flying object collides with and adheres to the rear blister fender portion 123 behind the LiDAR device 30. Therefore, when the vehicle V is traveling rearward, it is possible to suppress the flying object from the rear of the vehicle V from colliding with and adhering to the LiDAR device 30.

Figure 5:
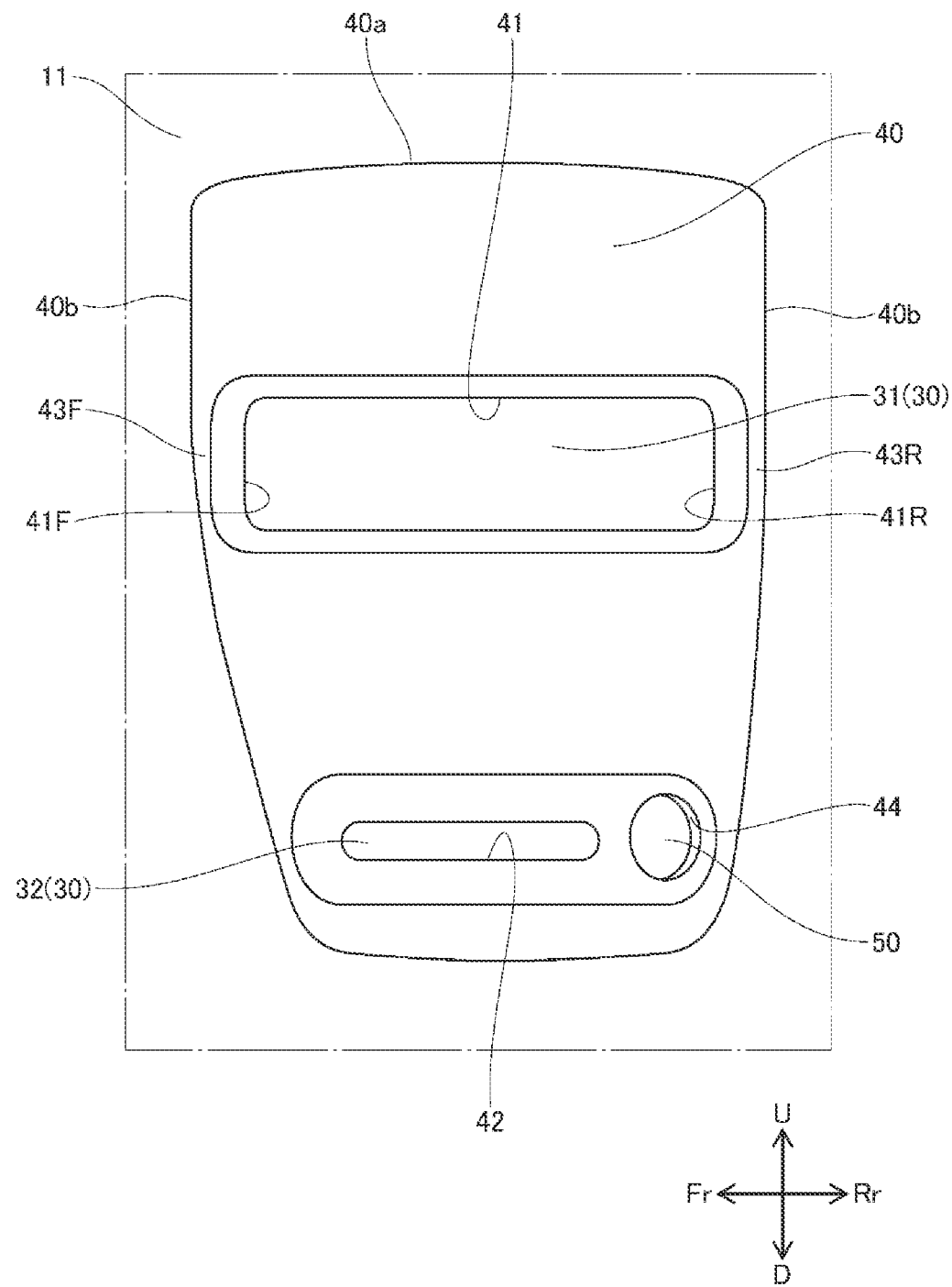
FIG. 5 is an enlarged view of a periphery of a LiDAR device provided in a fender panel on a left side of the vehicle in FIG. 1, as viewed from a left side of the vehicle.

As illustrated in FIG. 5, the LiDAR device 30 includes an external world information acquisition unit 31 which emits a laser beam emitted in a pulsed manner while scanning and measures scattered light and reflected light thereof, and a display unit 32 which displays information based on an operation state of the LiDAR device 30 to the outer portion of the vehicle V. In the present embodiment, the display unit 32 is provided below the external world information acquisition unit 31, and is an LED illumination device which is curved in a substantially circular arc shape outward in the left-right direction and extends in the front-rear direction. In the present embodiment, the display unit 32 is turned on when the LiDAR device 30 is in an operating state, and is turned off when the LiDAR device 30 is in anon-operating state. The traffic participant existing on the side of the vehicle V can visually recognize information on whether the LiDAR device 30 is in the operating state or in the non-operating state from the display unit 32 of the LiDAR device 30. The display unit 32 may be provided integrally with the external world information acquisition unit 31 or may be provided separately from the external world information acquisition unit 31.

The display unit 32 of the LiDAR device 30 is arranged so as to overlap the information display unit 192 provided on the front garnish 19 in the upper-lower direction of the vehicle V.

As a result, the traffic participant existing outside the vehicle V can visually recognize the information displayed on the information display unit 192 provided on the front garnish and the information displayed on the display unit 32 of the LiDAR device 30 without moving a line of sight in the upper-lower direction.

The LiDAR device 30 is covered with a cover portion 40 provided on the front fender panel 11. The cover portion 40 includes an upper surface portion 40a which protrudes from the front fender panel 11 in a substantially circular arc shape in a top view above the LiDAR device 30, and a side surface portion 40b which extends downward in a tubular shape from an outer edge of the substantially circular arc shape of the upper surface portion 40a.

An opening portion 41 is formed in the side surface portion 40b of the cover portion 40 at a position overlapping the external world information acquisition unit 31 of the LiDAR device 30 as viewed from the outside in the left-right direction of the vehicle V. The opening portion 41 is curved in a substantially circular arc shape in the top view along the side surface portion 40b and extends in the front-rear direction. The laser beam emitted from the external world information acquisition unit 31 of the LiDAR device 30 is emitted to the outside of the vehicle V through the opening portion 41 of the cover portion 40.

On the side surface portion 40b of the cover portion 40, a display window portion 42 is formed at a position overlapping the display unit 32 of the LiDAR device 30 as viewed from the outside in the left-right direction of the vehicle V. The display window portion 42 is curved in a substantially circular arc shape in a top view and extends in the front-rear direction along the side surface portion 40b below the opening portion 41. The display window portion 42 may be an opening visible to the display unit 32 of the LiDAR device 30 from the outside of the vehicle V, or may be covered with a light transmitting member, which is visible to the display unit 32 of the LiDAR device 30 from the outside of the vehicle V.

A front end portion 41F of the opening portion 41 does not extend to the front fender panel 11, and the side surface portion 40b of the cover portion 40 includes a front cover portion 43F which protrudes to the outside of the vehicle V in the left-right direction from the front fender panel 11 and extends to the front end portion 41F of the opening portion 41 in front of the LiDAR device 30.

As a result, when there is a flying object (including a small stone, an insect, mud, and the like) from the front of the vehicle V, the flying object collides with and adheres to the front cover portion 43F positioned in front of the LiDAR device 30. Therefore, it is possible to further suppress the flying object from the front of the vehicle V from colliding with and adhering to the LiDAR device 30.

A rear end portion 41R of the opening portion 41 does not extend to the front fender panel 11, and the side surface portion 40b of the cover portion 40 includes a rear cover portion 43R which protrudes to the outside of the vehicle V in the left-right direction from the front fender panel 11 and extends to the rear end portion 41R of the opening portion 41 behind the LiDAR device 30.

Figure 6A:
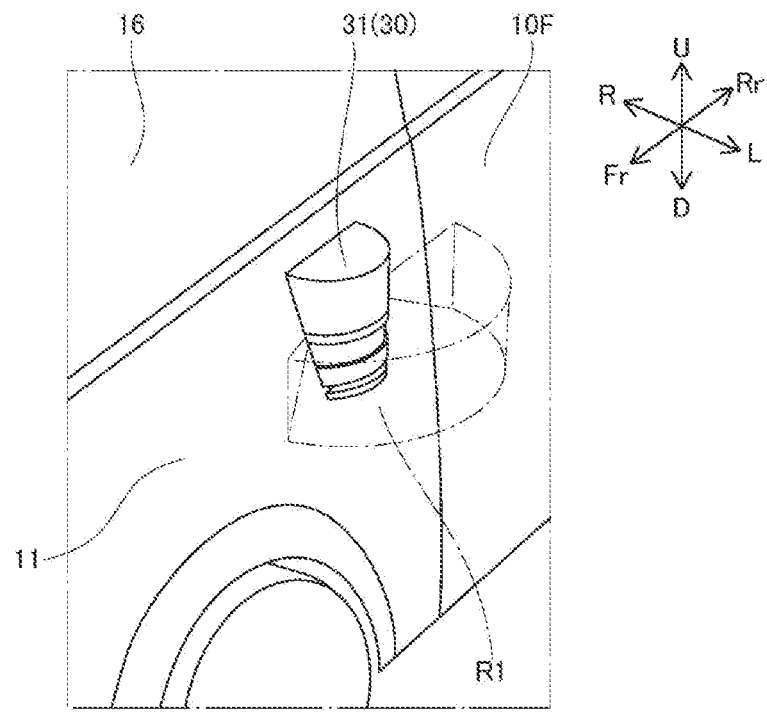
FIG. 6A is a view illustrating an external world information acquirable area in which an external world information acquisition unit of the LiDAR device can acquire external world information of the vehicle in a case where a cover portion is not provided in the vehicle, in the vehicle in FIG. 1.
Figure 7:
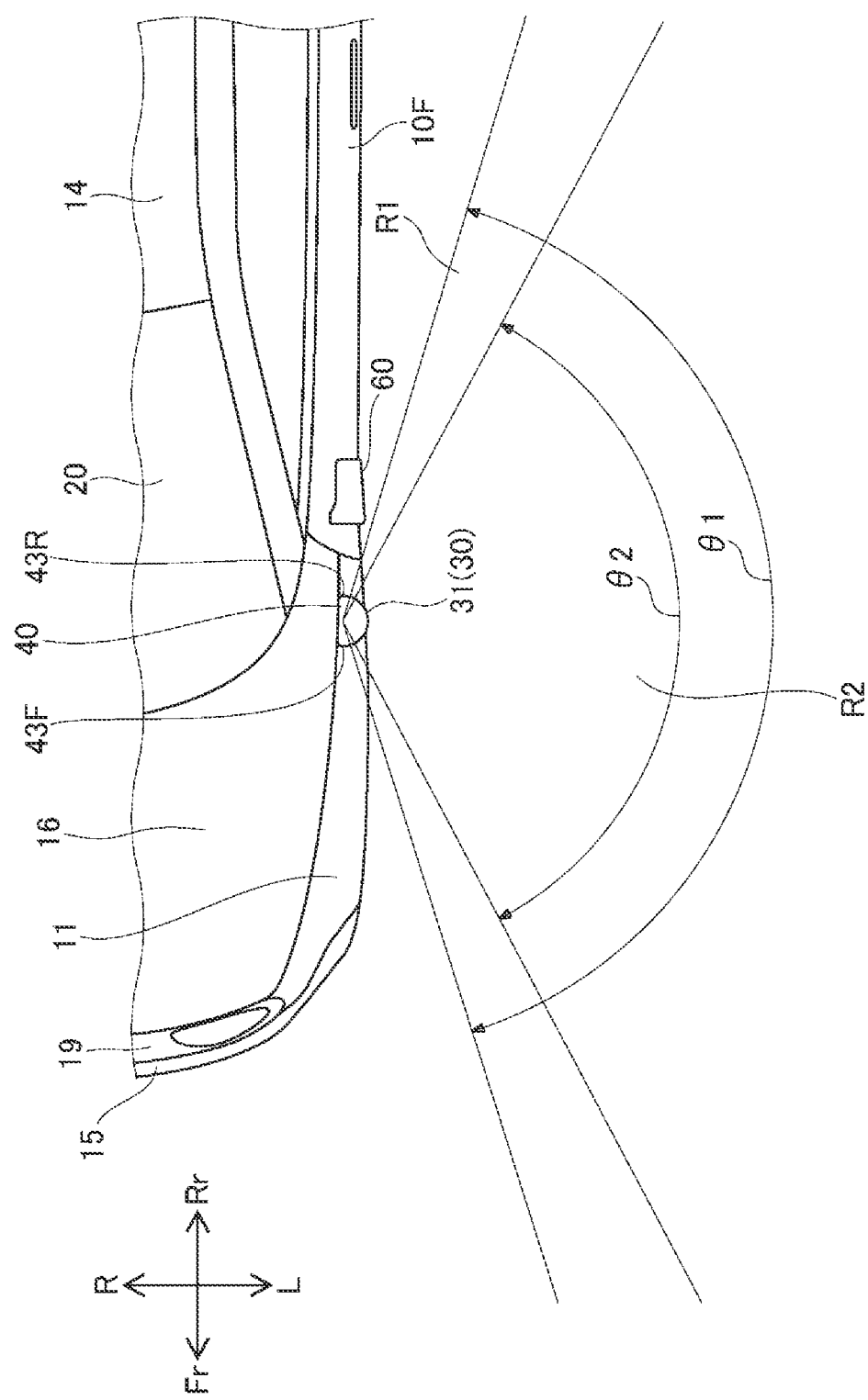
FIG. 7 is a top view of a main part of the vehicle, and is a view illustrating the external world information acquirable area and the external world information acquisition area in FIGS. 6A and 6B.

As illustrated in FIGS. 6A and 7, in a case where the cover portion 40 is not provided, an external world information acquirable area R1 in which the external world information acquisition unit 31 of the LiDAR device 30 can acquire the external world information of the vehicle V is a substantially fan-shaped area having an angle θ1 which is symmetrical in the front-rear direction around the external world information acquisition unit 31 on the side of the vehicle V in atop view. In the present embodiment, the angle θ1 is, for example, 180 degrees.

In the present embodiment, the front cover portion 43F protrudes to the outside of the vehicle V in the left-right direction from the front fender panel 11 so that at least a portion of the front cover portion 43F overlaps with the external world information acquirable area R1. The rear cover portion 43R protrudes to the outside of the vehicle V in the left-right direction from the front fender panel 11 so that at least a portion of the rear cover portion 43R overlaps with the external world information acquirable area R1.

Figure 6B:
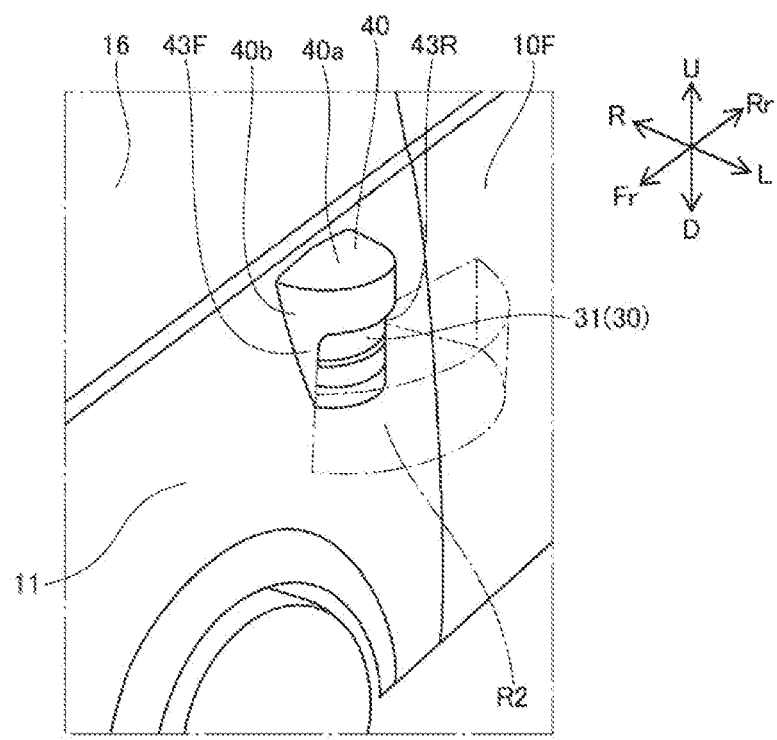
FIG. 6B is a view illustrating an external world information acquisition area in which the external world information acquisition unit of the LiDAR device actually acquires external world information of the vehicle in a case where the cover portion is provided in the vehicle, in the vehicle in FIG. 1.

Therefore, as illustrated in FIGS. 6B and 7, the laser beam emitted from the external world information acquisition unit 31 of the LiDAR device 30 is partially blocked by the front cover portion 43F and the rear cover portion 43R. Therefore, an external world information acquisition area R2 in which the external world information acquisition unit 31 of the LiDAR device 30 actually acquires the external world information of the vehicle V is an area in which a front end region and a rear end region of the external world information acquirable area R1 are deleted, and is a substantially fan-shaped area having an angle θ2 smaller than the angle θ1 around the external world information acquisition unit 31 on the side of the vehicle V in a top view. In the present embodiment, the angle θ2 is, for example, 90 degrees.

In this way, the front cover portion 43F protrudes from the front fender panel 11 to the outside of the vehicle V in the left-right direction so that at least a portion of the front cover portion 43F overlaps with the external world information acquirable area R1 within a range which does not interfere with the autonomous driving of the vehicle V, which will be described later. Therefore, it is possible to further suppress the flying object from the front of the vehicle V from colliding with and adhering to the LiDAR device 30.

As illustrated in FIG. 3, in a front view of the vehicle V, the LiDAR device 30 is arranged on an inner side of the vehicle V than the outermost portion of the front blister fender portion 113, that is, the outermost portion 1e of the side surface 1c of the outer shell member 1 in the left-right direction, in the left-right direction.

Accordingly, even when the vehicle V comes into contact with an obstacle on a side, the outermost portion of the front blister fender portion 113, which is the outermost portion 1e of the side surface 1c of the outer shell member 1 in the left-right direction, comes into contact with the obstacle on the side of the vehicle V earlier than the LiDAR device 30. Therefore, it is possible to suppress the obstacle from coming into contact with the LiDAR device 30, and it is possible to suppress the LiDAR device 30 from being damaged in the case where the vehicle V comes into contact with the obstacle on the side.

The LiDAR device 30 can be provided on the pair of left and right front fender panels 11 forming the side surface 1c of the outer shell member 1 of the vehicle V without increasing the total width of the vehicle V.

Therefore, in the case where the vehicle V comes into contact with an obstacle, it is possible to provide the roof camera device 70 and the LiDAR device 30 on the outer shell member 1 of the vehicle V while suppressing damage to the roof camera device 70 and the LiDAR device 30.

The roof camera device 70 and the LiDAR device 30 can be provided on the outer shell member 1 of the vehicle V without increasing the total height and the total width of the vehicle V.

The LiDAR device 30 is arranged such that the display unit 32 is positioned behind the front blister fender portion 113, and the display unit 32 is positioned at a position where the display unit 32 is not visible in the front view of the vehicle V.

Accordingly, when the display unit 32 of the LiDAR device 30 displays the information based on the operation state of the LiDAR device 30 to the outer portion of the vehicle V, the light emitted from the display unit 32 of the LiDAR device 30 can be prevented from directly entering the traffic participant existing in front of the vehicle V. Accordingly, it is possible to prevent the traffic participant existing in front of the vehicle V from erroneously recognizing the moving state of the vehicle V or the like by the light emitted from the display unit 32 of the LiDAR device 30.

The LiDAR device 30 provided in the front fender panel 11 on a left side of the vehicle V acquires second left-side external world information 300L as the second external world information 300, the second left-side external world information 300L being on the left side of the vehicle V. The LiDAR device 30 provided in the front fender panel 11 on a right side of the vehicle V acquires second right-side external world information 300R as the second external world information 3X), the second right-side external world information 300R being on the right side of the vehicle V.

(Side View Camera Device)

Returning to FIG. 5, the vehicle V further includes a pair of left and right side view camera devices 50. Each of the side view camera devices 50 forms an image of an external world of the vehicle V on an image capturing element, and converts the image into an image signal which is an electric signal, thereby acquiring third external world information 5X) of the vehicle V. The side view camera device 50 is an example of a third external world information acquisition device which acquires the third external world information 500.

The side view camera devices 50 are provided on the left and right front fender panels 11, and are arranged at positions adjacent to the rear of the display units 32 of the LiDAR devices 30 provided on the left and right front fender panels 11, respectively. The side view camera device 50 is covered with the cover portion 40 together with the LiDAR device 30.

The side surface portion 40b of the cover portion 40 is provided with a camera window portion 44 at a position overlapping the side view camera device 50 as viewed from the outside in the left-right direction of the vehicle V. The camera window portion 44 is provided at a position adjacent to the rear of the display window portion 42 provided on the side surface portion 40b of the cover portion 40. The camera window portion 44 may be an opening visible to the side view camera device 50 from the outer portion of the vehicle V, or may be covered with a light transmitting member, which is visible to the side view camera device 50 from the outside of the vehicle V. The side view camera device 50 acquires an external world image on the side of the vehicle V through the camera window portion 44 of the cover portion 40.

As described above, since the side view camera device 50 is covered with the cover portion 40 together with the LiDAR device 30, the side view camera device 50 can be protected from the flying object and the obstacle without increasing the number of components.

The side view camera device 50 provided on the front fender panel 11 on the left side of the vehicle V acquires third left-side external world information 500L as the third external world information 500, the third left-side external world information 500L being on the left side of the vehicle V. The side view camera device 50 provided on the front fender panel on the right side of the vehicle V acquires third right-side external world information 500R as the third external world information 500, the third right-side external world information 500R being on the right side of the vehicle V.

(Fixing of LiDAR Device and Side View Camera Device)

Figure 8A:
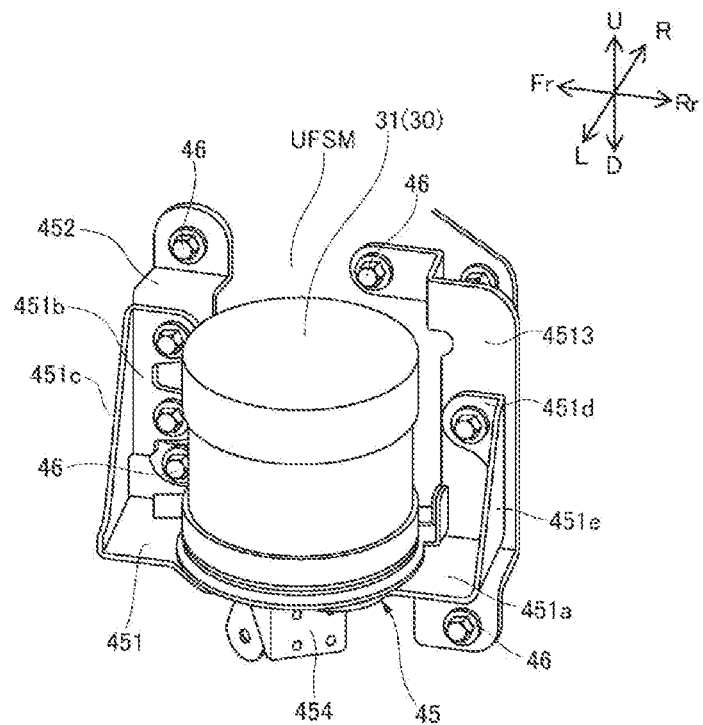
FIG. 8A is a perspective view of a main part illustrating a state in which the LiDAR device provided on the left side of the vehicle in FIG. 1 is attached to a bracket.
Figure 8B:
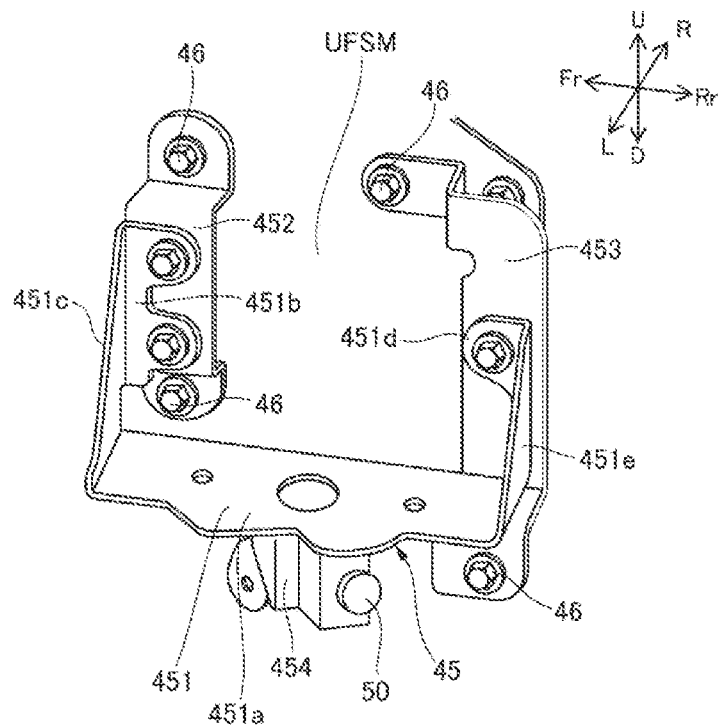
FIG. 8B is a perspective view of a main part illustrating a state in which a side view camera device provided on the left side of the vehicle in FIG. 1 is attached to the bracket.

As illustrated in FIGS. 8A and 8B, the LiDAR device 30 is fixed to a bracket 45 fixed to the vehicle V. In the present embodiment, the bracket 45 is fixed to an upper front side member UFSM, which is a side skeleton member of the vehicle V. The bracket 45 includes a placing portion 451 which protrudes from the upper front side member UFSM to the outside of the vehicle V, extends in the front-rear direction and the left-right direction, and has a placing surface 451a on which the LiDAR device 30 is placed, a front fixing portion 452 which faces a side surface of the upper front side member UFSM, extends in the upper-lower direction and the front-rear direction, and fixes a front end portion of the placing portion 451 to the upper front side member UFSM, a rear fixing portion 453 which faces the side surface of the upper front side member UFSM, extends in the upper-lower direction and the front-rear direction, and fixes a rear end portion of the placing portion 451 to the upper front side member UFSM, and a camera fixing portion 454 which protrudes downward from the placing portion 451 and to which the side view camera device 50 is fixed.

Therefore, as viewed from the left-right direction of the vehicle V, the bracket 45 forms a substantially U-shape whose upper side is opened by the placing portion 451, the front fixing portion 452, and the rear fixing portion 453, and the camera fixing portion 454 protrudes downward from the placing portion 451.

The placing portion 451 further includes a front end surface 451c extending upward from a front end of the placing surface 451a and having a front coupling portion 451b coupled to the front fixing portion 452, and a rear end surface 451e extending upward from a rear end of the placing surface 451a and having a rear coupling portion 451d coupled to the rear fixing portion 453.

The placing portion 451 is coupled to the front fixing portion 452 by caulking fixing or the like using a caulking pin at the front coupling portion 451b. The placing portion 451 is coupled to the rear fixing portion 453 by caulking fixing or the like using a caulking pin at the rear coupling portion 451d. It is needless to say that the coupling between the placing portion 451 and the front fixing portion 452 and the coupling between the placing portion 451 and the rear fixing portion 453 are not limited to the caulking fixing and may be realized by any means such as bolt fastening.

The camera fixing portion 454 is coupled to a lower surface of the placing surface 451a of the placing portion 451 by laser welding or the like.

The front fixing portion 452 and the rear fixing portion 453 are fixed to the side surface of the upper front side member UFSM by fastening members 46 such as a bolt at an upper end portion and a lower end portion, respectively. Accordingly, the bracket 45 is fixed to the upper front side member UFSM, which is the skeleton member of the vehicle V.

As illustrated in FIG. 6A, the external world information acquisition unit 31 of the LiDAR device 30 is fixed to the placing portion 451 by a bolt or the like in a state where the external world information acquisition unit 31 is placed on the placing surface 451a of the placing portion 451 of the bracket 45.

As illustrated in FIG. 6B, the side view camera device 50 is fixed to the bracket 45 together with the LiDAR device 30. The side view camera device 50 is fixed to the camera fixing portion 454 of the bracket 45 by a fastening member such as a bolt.

Accordingly, since the LiDAR device 30 and the side view camera device 50 are fixed to one bracket 45, the number of components for fixing the LiDAR device 30 and the side view camera device 50 to the vehicle V can be reduced.

The display unit 32 of the LiDAR device 30 may be provided integrally with the external world information acquisition unit 31, may be fixed to the external world information acquisition unit 31, may be directly fixed to the bracket 45, or may be fixed to the cover portion 40.

(Side Camera Mirror Device)

Returning to FIG. 1, the vehicle V further includes a pair of left and right side camera mirror devices 60. Each of the side camera mirror devices 60 forms an image of the external world of the vehicle V on the image capturing element, and converts the image into an image signal which is an electric signal, thereby acquiring fourth external world information 600 of the vehicle V. The side camera mirror device 60 is an example of a fourth external world information acquisition device which acquires the fourth external world information 600.

The side camera mirror device 60 is provided on the front door 10F forming the side surface 1c of the outer shell member 1, and protrudes outward in the left-right direction of the vehicle V from the front door 10F. In the present embodiment, the side camera mirror device 60 is provided in the vicinity of a front end of the front door 10F and above the LiDAR device 30.

Figure 9:
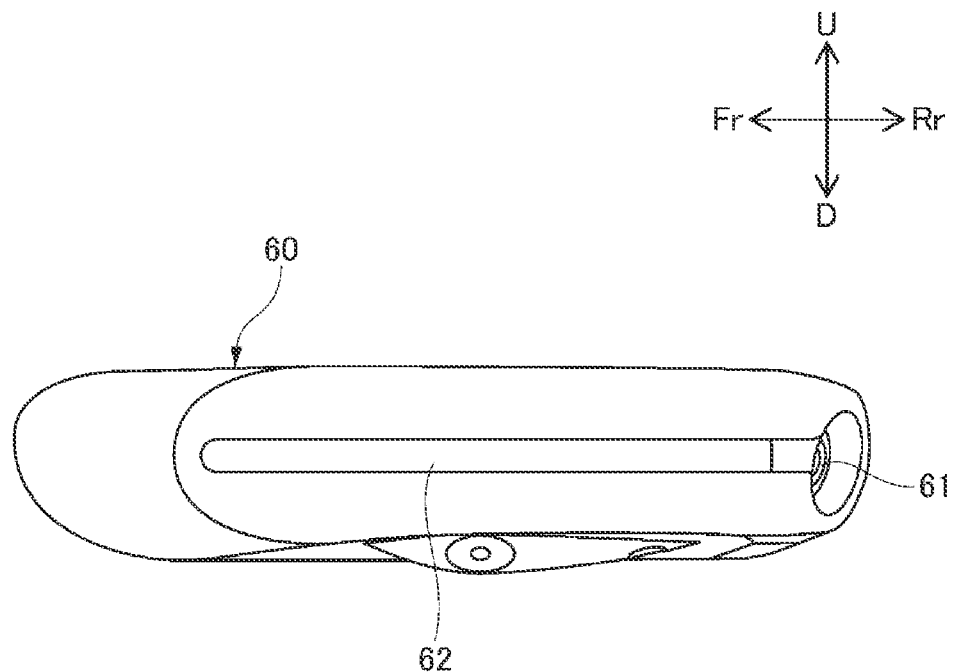
FIG. 9 is an enlarged view of a side camera mirror device provided on the left side of the vehicle in FIG. 1.

As illustrated in FIG. 9, the side camera mirror device 60 includes an image capturing unit 61 and a direction display unit 62.

The image capturing unit 61 is an imaging device which forms an image of the external world of the vehicle V on the image capturing element and converts the image into an image signal which is an electrical signal. The image capturing unit 61 is provided at a rear end portion of the side camera mirror device 60. The image capturing unit 61 acquires the external world image of the rear side of the side portion of the vehicle V.

The direction display unit 62 is an LED illumination device. The direction display unit 62 is provided on the outer side surface of the vehicle V of the side camera mirror device 60 and extends in the front-rear direction. The direction display unit 62 blinks in orange in accordance with a traveling direction of the vehicle V, and displays the traveling direction of the vehicle V to the outer portion of the vehicle V.

The image capturing unit 61 of the side camera mirror device 60 provided on the left front door 10F of the vehicle V acquires fourth left-side external world information 600L as the fourth external world information 600, the fourth left-side external world information 600L being on a left rear side of the vehicle V. The image capturing unit 61 of the side camera mirror device 60 provided on the right front door 10F of the vehicle V acquires fourth right-side external world information 600R as the fourth external world information 600, the fourth right-side external world information 600R being on a right rear side of the vehicle V.

The fourth left-side external world information 600L acquired by the image capturing unit 61 of the side camera mirror device 60 provided on the left front door 10F of the vehicle V is displayed as an external world image on the left rear side of the vehicle V on a display device 63L (see FIG. 10) configured by a liquid crystal display (LCD) display panel, an organic electroluminescence (EL) display panel, or the like provided in the vehicle compartment CB. The fourth right-side external world information 600R acquired by the image capturing unit 61 of the side camera mirror device 60 provided on the right front door 10F of the vehicle V is displayed as an external world image on the right rear side of the vehicle V on a display device 63R (see FIG. 10) configured by the LCD display panel, the organic EL display panel, or the like provided in the vehicle compartment CB.

The direction display unit 62 of the side camera mirror device 60 provided on the left front door 10F of the vehicle V blinks in orange in a case where the vehicle V turns left or in a case where the vehicle V changes a lane to the left adjacent lane. The direction display unit 62 of the side camera mirror device 60 provided on the right front door 10F of the vehicle V blinks in orange in a case where the vehicle V turns right and in a case where the vehicle changes a lane to the right adjacent lane. In addition, in a case where the vehicle V (own vehicle) is an obstacle of traffic, both the direction display unit 62 of the side camera mirror device 60 provided on the left front door 10F of the vehicle V and the direction display unit 62 of the side camera mirror device 60 provided on the right front door of the vehicle V simultaneously blink in orange.

As illustrated in FIG. 3, in the front view of the vehicle V, the side camera mirror device 60 is arranged on the inner side of the vehicle V than the outermost portion of the front blister fender portion 113, that is, the outermost portion 1e of the side surface 1c of the outer shell member 1 in the left-right direction.

Accordingly, in the case where the vehicle V comes into contact with the obstacle on the side, the outermost portion of the front blister fender portion 113, which is the outermost portion 1e of the side surface 1c of the outer shell member 1, comes into contact with the obstacle on the side of the vehicle V earlier than the side camera mirror device 60. Therefore, it is possible to suppress the obstacle from coming into contact with the side camera mirror device 60, and it is possible to suppress the side camera mirror device 60 from being damaged in the case where the vehicle V comes into contact with the obstacle on the side.

The side camera mirror device 60 is arranged such that the direction display unit 62 is positioned above the front blister fender portion 113, and the direction display unit 62 is positioned at a visible position in the front view of the vehicle V.

Accordingly, when the direction display unit 62 of the side camera mirror device 60 blinks in orange, the traffic participant existing in front of the vehicle V can visually recognize that the direction display unit 62 of the side camera mirror device 60 is blinking in orange. Therefore, the traffic participant existing in front of the vehicle V can more reliably recognize the traveling direction of the vehicle V.

(Vehicle Driving Control Device)

Figure 10:
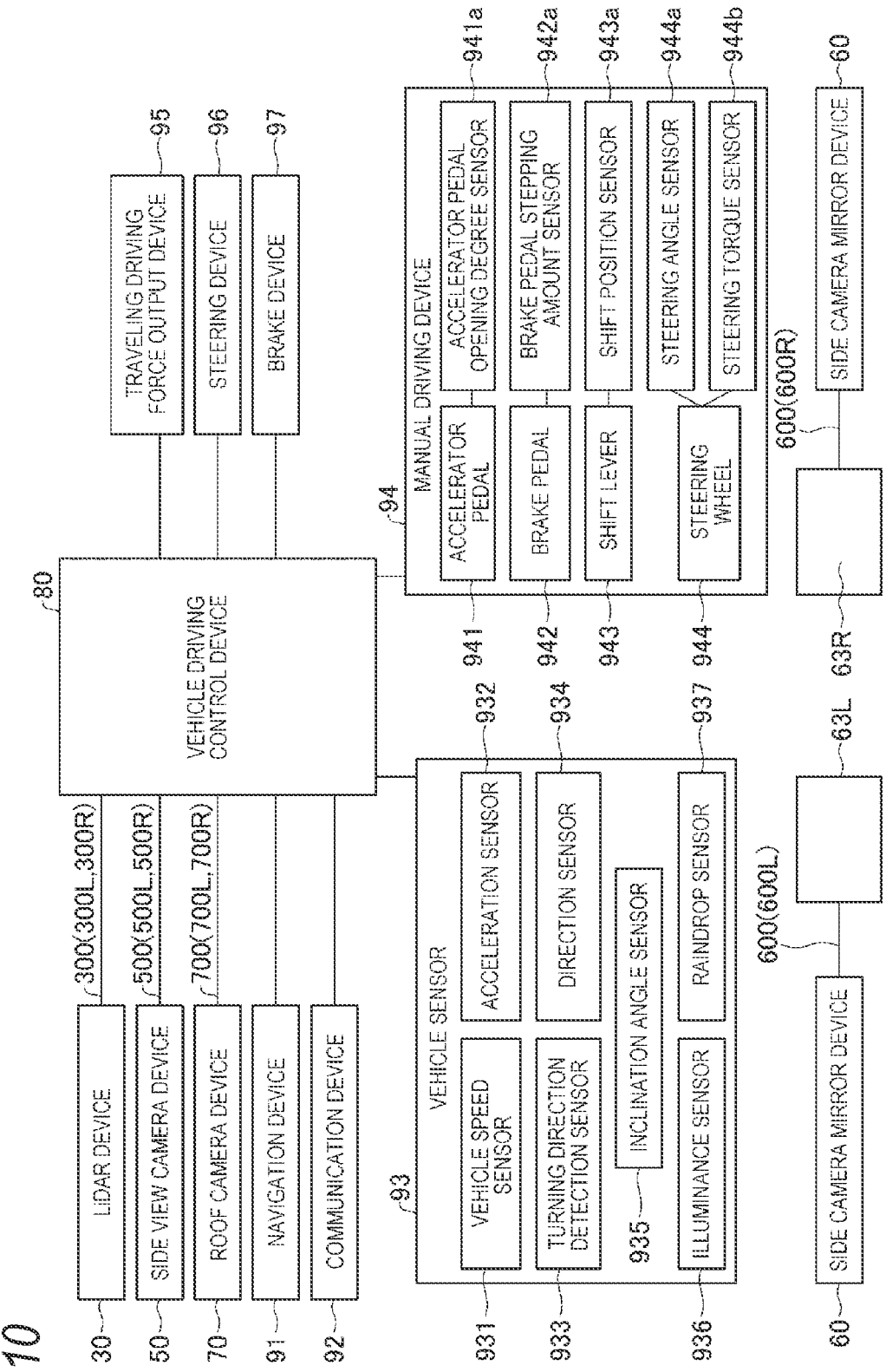
FIG. 10 is a block diagram illustrating a vehicle driving control device of the vehicle in FIG. 1.

Next, a vehicle driving control device 80 mounted on the vehicle V will be described with reference to FIG. 10.

The vehicle V is equipped with a navigation device 91, a communication device 92, a vehicle sensor 93, a manual driving device 94, a traveling driving force output device 95, a steering device 96, and a brake device 97 in addition to the above-described LiDAR device 30, the side view camera device 50, the side camera mirror device 60, and the roof camera device 70.

The vehicle driving control device 80 is connected to the LiDAR device 30, the side view camera device 50, the roof camera device 70, the navigation device 91, the communication device 92, the vehicle sensor 93, the manual driving device 94, the traveling driving force output device 95, the steering device 96, and the brake device 97 so as to be able to perform data communicate with each other via a communication medium.

The navigation device 91 includes a global navigation satellite system (GNSS) receiver, map information, and the like. The navigation device 91 has a function of detecting a current position of the vehicle V by the GNSS receiver and deriving a route to a destination designated by an occupant or the like of the vehicle V based on the detected current position and map information.

The communication device 92 performs wireless communication with an information providing server of a system which monitors a traffic situation of a road, and acquires traffic information indicating a traffic situation of a road on which the vehicle V is traveling or a road on which the vehicle V is scheduled to travel. The traffic information includes information such as congestion information in front, required time information for passing through a congestion point, accident/failure vehicle/construction information, speed regulation and lane regulation information, position information of a parking lot, and full/empty information of a parking lot/service area/parking area. The communication device 92 may acquire the traffic information by road-to-vehicle communication with a wireless beacon provided on a side band of a road or the like, or by vehicle-to-vehicle communication with another vehicle traveling around the vehicle V.

The communication device 92 performs wireless communication with an information providing server of a Traffic Signal Prediction Systems (TSPS), and acquires signal information of a traffic light provided on a road on which the vehicle V is traveling or a road on which the vehicle V is scheduled to travel. The TSPS supports driving for smoothly passing through a signal intersection using the signal information of the traffic light. The communication device 92 may acquire the signal information by the road-to-vehicle communication with the wireless beacon provided on the side band of the road or the like, or by vehicle-to-vehicle communication with another vehicle traveling around the vehicle V.

The vehicle sensor 93 has a function of detecting various information on the vehicle V. The vehicle sensor 93 includes various sensors which detect the moving state of the vehicle V, which include a vehicle speed sensor 931 which detects a vehicle speed of the vehicle V, an acceleration sensor 932 which detects an acceleration in the front-rear direction and the left-right direction of the vehicle V, a turning direction detection sensor 933 which detects a turning direction of the vehicle V from an angular velocity around a vertical axis of the vehicle V, a direction sensor 934 which detects a direction of the vehicle V, and an inclination angle sensor 935 which detects an inclination angle of the vehicle V. The vehicle sensor 93 further includes various sensors which detect an external environment of the vehicle V, which include an illuminance sensor 936 which detects illuminance of a place where the vehicle V is existing, and a raindrop sensor 937 which detects an amount of raindrops in the place where the vehicle V is existing.

The manual driving device 94 includes an accelerator pedal 941 which is an acceleration/deceleration operation member which receives an acceleration/deceleration instruction from the occupant, a brake pedal 942 which is a braking operation member which receives a braking instruction by the occupant, a shift lever 943 which is a shift operation member for receiving an instruction to change a shift stage by the occupant, and a steering wheel 944 which is a steering member which receives a turning instruction by the occupant.

The manual driving device 94 further includes an accelerator pedal opening degree sensor 941a which detects a stepping-down amount of the accelerator pedal 941 and outputs an accelerator opening degree signal to the vehicle driving control device 80, a brake pedal stepping amount sensor 942a which detects the stepping-down amount (or a stepping-down force) of the brake pedal 942 and outputs a brake signal to the vehicle driving control device 80, a shift position sensor 943a which detects the shift stage instructed by the shift lever 943 and outputs a shift position signal to the vehicle driving control device 80, a steering angle sensor 944a which detects a steering angle of the steering wheel 944 and outputs a steering angle signal to the vehicle driving control device 80, and a steering torque sensor 944b which detects a torque applied to the steering wheel 944 and outputs a steering torque signal to the vehicle driving control device 80.

The traveling driving force output device 95 is a device which includes a drive source and outputs power of the drive source as a driving force of the vehicle V to the front wheel FW and/or the rear wheel RW, which are the drive wheels.

The steering device 96 is a device which changes a direction of the front wheel FW and/or the rear wheel RW, which are turning wheels of the vehicle V.

The brake device 97 is a device which outputs a braking force to the front wheel FW and the rear wheel RW.

The vehicle driving control device 80 is configured by, for example, one or more processors or hardware having equivalent functions. The vehicle driving control device 80 may have a configuration in which a processor such as a central processing unit (CPU), a storage device, an electronic control unit (ECU) in which a communication interface is connected by an internal bus, a micro-processing unit (MPU), or the like are combined.

The vehicle driving control device 80 controls the driving (movement) of the vehicle V by controlling the traveling driving force output device 95, the steering device 96, and the brake device 97. The vehicle driving control device 80 controls the traveling driving force output device 95, the steering device 96, and the brake device 97 by the processor executing a program (software). In addition, some or all of these control functions may be realized by hardware such as large scale integration (LSI) or an application specific integrated circuit (ASIC), or may be realized by a combination of software and hardware.

Based on an operation of the manual driving device 94 by the occupant, the vehicle driving control device 80 can control the traveling driving force output device 95, the steering device 96, and the brake device 97 to cause the vehicle V to be manually operated.

When the vehicle V is manually operated, the vehicle driving control device 80 may control the traveling driving force output device 95, the steering device 96, and the brake device 97 based on one or more information of the first external world information 700 (the first left-side external world information 700L and the first right-side external world information 700R) acquired by the roof camera device 70, the second external world information 300 (the second left-side external world information 300L and the second right-side external world information 300R) acquired by the LiDAR device 30, the third external world information 500 (the third left-side external world information 500L and the third right-side external world information 500R) acquired by the side view camera device 50, the current position of the vehicle V detected by the navigation device 91, the map information of the navigation device 91, the route to the destination of the vehicle V derived by the navigation device 91, the traffic information and the signal information acquired by the communication device 92, and the moving state of the vehicle V and the external environment of the vehicle V acquired by the vehicle sensor 93, in addition to the accelerator opening degree signal, the brake signal, the shift position signal, the steering angle signal, the steering torque signal, and the like output from the manual driving device 94.

Without depending on the operation of the manual driving device 94 by the occupant, the vehicle driving control device 80 can control the traveling driving force output device 95, the steering device 96, and the brake device 97 to cause the vehicle V to autonomously operate (autonomously move).

When the vehicle V is autonomously operated, the vehicle driving control device 80 controls the traveling driving force output device 95, the steering device 96, and the brake device 97 based on the first external world information 700 (the first left-side external world information 700L and the first right-side external world information 700R) acquired by the roof camera device 70, the second external world information 300 (the second left-side external world information 300L and the second right-side external world information 300R) acquired by the LiDAR device 30, the third external world information 500 (the third left-side external world information 500L and the third right-side external world information 500R) acquired by the side view camera device 50, the current position of the vehicle V detected by the navigation device 91, the map information of the navigation device 91, the route to the destination of the vehicle V derived by the navigation device 91, the traffic information and the signal information acquired by the communication device 92, and the moving state of the vehicle V and the external environment of the vehicle V acquired by the vehicle sensor 93 to cause the vehicle V to autonomously operate (autonomously move).

In the present embodiment, the side camera mirror device 60 is not directly connected to the vehicle driving control device 80 so as to be able to perform the data communication. Further, the vehicle driving control device 80 controls the traveling driving force output device 95, the steering device 96, and the brake device 97 without depending on the fourth external world information 600 (the fourth left-side external world information 600L and the fourth right-side external world information 600R) acquired by the side camera mirror device 60. Therefore, the vehicle V autonomously drives without depending on the fourth external world information 600 (the fourth left-side external world information 600L and the fourth right-side external world information 600R) acquired by the side camera mirror device 60.

Although one embodiment of the present disclosure has been described above with reference to the accompanying drawings, it is needless to say that the present disclosure is not limited to such an embodiment. It is apparent to those skilled in the art which various changes and modifications can be conceived within the scope of the claims, and it is also understood that the various changes and modifications belong to the technical scope of the present disclosure. In addition, the constituent elements in the above-described embodiment may be freely combined without departing from a spirit of the disclosure.

For example, in the present embodiment, the vehicle has been described as an example of the moving body of the present disclosure, but the moving body is not limited to the vehicle. The moving body is not limited to a vehicle, and may be a robot, a ship, an aircraft, or the like that includes a drive source and is movable by power of the drive source.

For example, in the present embodiment, the first external world information acquisition device is the roof camera device 70, but the roof camera device 70 is the example of the first external world information acquisition device. The first external world information acquisition device is not limited to a camera device, and may be the LiDAR device, a millimeter wave radar device, or the like.

For example, each of the pair of left and right roof camera devices 70 may be provided at a rear end portion of the upper surface 141 of the roof panel 14 forming the upper surface of the outer shell member 1 so as to protrude upward from the upper surface 141 of the roof panel 14. That is, each of the pair of left and right roof camera devices 70 may be arranged at a position adjacent to the upper end portion of the rear window 181 of the vehicle V. For example, one of the pair of left and right roof camera devices 70 is provided at the left end portion on the rear end portion of the upper surface 141 of the roof panel 14, and the other of the pair of left and right roof camera devices 70 is provided at the right end portion on the rear end portion of the upper surface 141 of the roof panel 14. In this case, the display units 75 of the pair of left and right roof camera devices 70 are arranged above the rear window display unit 182 which extends in the left-right direction at the upper end portion of the rear window 181.

Accordingly, the information based on the moving state (driving state) of the vehicle V displayed by the rear window display unit 182, that is, in the present embodiment, the information on whether the vehicle V is in the autonomous driving state in which the vehicle V autonomously moves, and the information based on the operation state of the roof camera device 70 displayed by the display unit 75 of each of the pair of left and right roof camera devices 70, that is, in the present embodiment, the information on whether the roof camera device 70 is in the operating state or in the non-operating state can be prevented from being erroneously recognized by the person existing outside the vehicle V.

For example, in the present embodiment, it is assumed that the second external world information acquisition device is the LiDAR device 30, but the LiDAR device 30 is the example of the second external world information acquisition device. The second external world information acquisition device is not limited to the LiDAR device 30, may be a device capable of acquiring the external world information of the vehicle V by means other than the LiDAR, and may be, for example, the millimeter wave radar device, the camera device, or the like.

For example, in the present embodiment, the third external world information acquisition device is the side view camera device 50, but the side view camera device 50 is the example of the third external world information acquisition device. The third external world information acquisition device is not limited to the camera device, and may be the LiDAR device, the millimeter wave radar device, or the like. At this time, it is preferable that the second external world information acquisition device and the third external world information acquisition device be, for example, a combination of devices which acquire the external world information by different means, such as a combination of the LiDAR device and the millimeter wave radar device, a combination of the LiDAR device and the camera device, and a combination of the millimeter wave radar device and the camera device.

For example, in the present embodiment, the fourth external world information acquisition device is the side camera mirror device 60, but the side camera mirror device 60 may be the example of the fourth external world information acquisition device. The fourth external world information acquisition device may be a mirror unit which includes a mirror surface portion instead of the image capturing unit 61 and displays a mirror image reflected on the mirror surface portion toward an occupant in the vehicle compartment CB as the fourth external world information.

At least the following matters are described in the present specification. In the parentheses, the corresponding constituent elements and the like in the above-described embodiment are illustrated as an example, but the present disclosure is not limited thereto.

(1) A moving body (vehicle V) including:
a first external world information acquisition device (roof camera device 70), in which:
the moving body is autonomously movable based on first external world information (first external world information 700) acquired by the first external world information acquisition device;
an outer shell member (outer shell member 1) of the moving body includes an upper surface (upper surface 1d) facing upward of the moving body;
the first external world information acquisition device is provided on the upper surface; and the first external world information acquisition device is arranged below an uppermost portion (uppermost portion 1f) of the upper surface in an upper-lower direction of the moving body.

According to (1), since the first external world information acquisition device is provided on the upper surface of the outer shell member and is arranged below the uppermost portion of the upper surface in the upper-lower direction, even when the moving body comes into contact with an obstacle above, the uppermost portion of the upper surface of the outer shell member comes into contact with the obstacle above the moving body earlier than the first external world information acquisition device. As a result, it is possible to suppress the obstacle from coming into contact with the first external world information acquisition device.

The first external world information acquisition device can be provided on a side surface of the outer shell member of the moving body without increasing the total height of the moving body.

(2) The moving body according to (1), in which:
the first external world information acquisition device includes,
a first acquisition unit (telephoto camera unit 71, wide-angle camera unit 72) configured to acquire the first external world information, and
a cover portion (cover portion 74) covering the first acquisition unit; and
a shape of an upper surface (upper surface 74a) of the cover portion is similar to a shape of the upper surface of the outer shell member, in a front view of the moving body.

According to (2), since the shape of the upper surface of the cover portion of the first external world information acquisition device is similar to the shape of the upper surface of the outer shell member in the front view of the moving body, a sense of unity between the first external world information acquisition device and the upper surface of the outer shell member is improved by a visual effect. Accordingly, when a person existing outside the moving body views the moving body, it is possible to reduce a sense of discomfort caused by the first external world information acquisition device protruding upward from the upper surface of the outer shell member.

(3) The moving body according to (1) or (2), in which:
a window portion (front window 20, rear window 181) is provided on a front surface or a rear surface of the moving body;
the window portion is provided with a window display unit (front window display unit 21, rear window display unit 182) configured to display information based on a moving state of the moving body to an outer portion of the moving body;
the first external world information acquisition device is arranged at a position adjacent to the window portion;
the first external world information acquisition device includes a first display unit (display unit 75) configured to display information based on an operation state of the first external world information acquisition device to the outer portion of the moving body; and the first display unit is arranged above the window display unit.

According to (3), since the first display unit is arranged above the window display unit, the information based on the moving state of the moving body displayed by the window display unit and the information based on the operation state of the first external world information acquisition device displayed by the first display unit of the first external world information acquisition device can be prevented from being erroneously recognized by the person existing outside the moving body.

(4) The moving body according to (3), in which:

a front seat (front seat FS) on which an occupant is capable of sitting and a rear seat (rear seat RS) which is arranged behind the front seat and on which an occupant is capable of sitting are provided inside the moving body;

the first external world information acquisition device is arranged at a position adjacent to the window portion provided on the front surface of the moving body; and the first external world information acquisition device is arranged at a position closer to the front seat than the rear seat in a front-rear direction of the moving body.

According to (4), since the first external world information acquisition device is arranged at a position adjacent to the window portion provided on the front surface of the moving body and is arranged at a position closer to the front seat than the rear seat in the front-rear direction of the moving body, the first external world information acquisition device can acquire the external world information as the first external world information, the external world information being close to a front field of view of the occupant seated in the front seat.

(5) The moving body according to any one of (1) to (4), further including:

a second external world information acquisition device (LiDAR device 30) configured to acquire second external world information (second external world information 300), in which:

the moving body autonomously moves based on the second external world information;

the outer shell member includes side surfaces (a side surface 1c) facing a left-right direction of the moving body; and the second external world information acquisition device is provided on the side surface; and the second external world information acquisition device is arranged on an inner side of the moving body than an outermost portion (outermost portion 1e) of the side surface in the left-right direction.

According to (5), since the second external world information acquisition device is provided on the side surface of the outer shell member and is arranged on the inner side of the moving body than the outermost portion of the side surface in the left-right direction, even when the moving body comes into contact with an obstacle on a side, the outermost portion of the side surface of the outer shell member comes into contact with the obstacle on the side of the moving body earlier than the second external world information acquisition device. As a result, it is possible to suppress the obstacle from coming into contact with the second external world information acquisition device.

The second external world information acquisition device can be provided on the side surface of the outer shell member of the moving body without increasing the total width of the moving body.

Therefore, in a case where the moving body comes into contact with the obstacle, it is possible to provide the first external world information acquisition device and the second external world information acquisition device on the outer shell member of the moving body while suppressing damage to the first external world information acquisition device and the second external world information acquisition device.

The first external world information acquisition device and the second external world information acquisition device can be provided on the outer shell member of the moving body without increasing the total height and the total width of the moving body.

(6) The moving body according to (5), in which:

the side surface of the outer shell member includes a front widened portion (front blister fender portion 113) which bulges outward in the left-right direction, and a rear widened portion (rear blister fender portion 123) which bulges outward in the left-right direction behind the front widened portion in a front-rear direction of the moving body, in a top view of the moving body; and the second external world information acquisition device is arranged between the front widened portion and the rear widened portion in the front-rear direction.

According to (6), since the second external world information acquisition device is arranged between the front widened portion and the rear widened portion in the front-rear direction, in a case where there is a flying object from the front when the moving body is traveling forward, the flying object collides with and adheres to the front widened portion in front of the second external world information acquisition device, and in a case where there is a flying object from the rear when the moving body is traveling rearward, the flying object collides with and adheres to the rear widened portion behind the second external world information acquisition device. As a result, it is possible to suppress the flying object from the front and the rear of the moving body from colliding with and adhering to the second external world information acquisition device when the moving body is traveling forward and rearward.

(7) The moving body according to (5) or (6), in which:

the second external world information acquisition device includes a second display unit (display unit 32) configured to display information based on an operation state of the second external world information acquisition device to the outer portion of the moving body; and the second display unit is positioned on the inner side of the moving body than the outermost portion of the side surface in the left-right direction, and is arranged at a position where the second display unit is not visible in the front view of the moving body.

According to (7), since the second external world information acquisition device is arranged such that the second display unit is positioned at the position where the second display unit is not visible in the front view, when the second display unit displays the information based on the operation state of the second external world information acquisition device to the outer portion of the moving body, light emitted from the second display unit can be prevented from directly entering a traffic participant existing in front of the moving body. Accordingly, it is possible to prevent the traffic participant existing in front of the moving body from erroneously recognizing the moving state of the moving body or the like by the light emitted from the second display unit.

What is claimed is:

1. A moving body comprising:
a plurality of first external world information acquisition devices, wherein:
the moving body is autonomously movable based on first external world information acquired by the plurality of first external world information acquisition devices;
an outer shell member of the moving body includes an upper surface facing upward of the moving body;
the plurality of first external world information acquisition devices are provided on the upper surface;
all of the plurality of first external world information acquisition devices are arranged below an uppermost portion of the upper surface in an upper-lower direction of the moving body;
a window portion is provided on a front surface or a rear surface of the moving body;
the window portion is provided with a window display unit configured to display information based on a moving state of the moving body to an outer portion of the moving body;
the plurality of first external world information acquisition devices are arranged at a position adjacent to the window portion;
each first external world information acquisition device of the plurality of first external world information acquisition devices includes a first display unit configured to display information based on an operation state of a respective first external world information acquisition device to the outer portion of the moving body; and
the first display unit is arranged above the window display unit.

2. The moving body according to claim 1, wherein:
a front seat on which an occupant is capable of sitting and a rear seat which is arranged behind the front seat and on which an occupant is capable of sitting are provided inside the moving body;
the first external world information acquisition device is arranged at a position adjacent to the window portion provided on the front surface of the moving body; and
the first external world information acquisition device is arranged at a position closer to the front seat than the rear seat in a front-rear direction of the moving body.

* * * * *